Patented June 23, 1942

2,287,348

UNITED STATES PATENT OFFICE 2,287,348

COATING PAPER

James Grant Hayden, Jr., Westernport, Md., assignor to West Virginia Pulp and Paper Company, New York, N. Y., a corporation of Delaware No Drawing. Application May 11, 1939,
Serial No. 272,961

5 Claims. (Cl. 117—155)

My present invention relates to improved compositions for coating paper and to the paper coated therewith.

Ordinarily, paper is coated with a composition containing a mineral pigment, such as clay, chalk, calcium sulfite, calcium sulfate, and occasionally titanium oxide, together with an adhesive as a binding element, usually casein, the mixture being suspended in sufficient water to enable the coating to be applied as a liquid of varying viscosity and solid content. Often such a coating composition is referred to in the art as "color." After the coating is applied it is ordinarily smoothed out by various devices known to the art and the paper so coated, dried.

In lieu of a suspension of mineral pigments in water and a water soluble adhesive, the present invention seeks to provide a coating composition comprising a suspension of mineral pigments in a volatile, non-aqueous, preferably non-inflammable solvent together with an adhesive of special properties soluble therein. When using a non-aqueous solvent the base sheet to be coated is not wet in the usual sense, whereby it does not lose its strength nor does it stretch or wrinkle or lose its shape. Furthermore, the paper so coated, depending upon the amount of adhesive used, is to a considerable degree wash or waterproof.

After considerable experimentation I have discovered that various synthetic resins or plastic materials may be used as the adhesive with volatile non-aqueous and non-inflammable solvents in which the resins do not exceed 30% of the total coating composition on a dry basis. Among plastic materials which have been found satisfactory may be mentioned ethyl cellulose, polyvinyl acetate-methylal, polyvinyl acetate-acetal, polystyrene, cellulose acetobutyrate.

Solvents which have been found satisfactory are volatile chlorinated hydrocarbon compounds such, for example, as carbon tetrachloride, ethylene dichloride, dichlor ethylene, trichlor ethylene, chloroform, etc., it being desirable that the boiling point of the solvents selected should not be in excess of 200° C.

The following common mineral pigments may among others be used either singly or in combination: clay, chalk, calcium sulfite, titanium oxide and other known titanium-containing pigments, zinc oxide and other zinc-containing pigments.

The manner of use of the above mentioned ingredients in my improved coating composition may be illustrated by the following specific examples:

(1) Solvent: carbon tetrachloride
   Adhesive: ethyl cellulose
   Pigment: clay
   Percent adhesive based on pigment: 15
   Percent solids by weight: 6.3

(2) Solvent: carbon tetrachloride
   Adhesive: polystyrene
   Pigment: clay
   Percent adhesive: 15
   Percent solids: 5.5

(3) Solvent: dichlor ethylene
   Adhesive: polyvinyl acetate-methylal
   Pigment: clay
   Percent adhesive: 15
   Percent solids: 8

(4) Solvent: dichlor ethylene
   Adhesive: polyvinyl acetate-acetal
   Pigment: clay
   Percent adhesive: 15
   Percent solids: 8.5

(5) Solvent: dichlor ethylene
   Adhesive: polyvinyl acetate-acetal
   Pigment: clay
   Percent adhesive: 5
   Percent solids: 8.5

(6) Solvent: dichlor ethylene
   Adhesive: polyvinyl acetate-methylal
   Pigment: clay
   Percent adhesive: 5
   Percent solids: 7.5

(7) Solvent: dichlor ethylene
   Adhesive: cellulose acetobutyrate
   Pigment: clay
   Percent adhesive: 15
   Percent solids: 8.5

(8) Solvent: ethylene dichloride
   Adhesive: polyvinyl acetate-acetal
   Pigment: chalk
   Percent adhesive: 10.0
   Percent solids: 11.9

(9) Solvent: ethylene dichloride
   Adhesive: polyvinyl acetate-acetal
   Pigment: calcium sulfite
   Percent adhesive: 10
   Percent solids: 11.3

(10) Solvent: ethylene dichloride
   Adhesive: ethyl cellulose
   Pigment: calcium sulfite
   Percent adhesive: 15.0
   Percent solids: 9.0

It will be noted that in the foregoing examples the amount of adhesive is varied from 3% to as high as 15%, although for special purposes, as where a high degree of water resistance is required, the amount of adhesive may run as high as 30%. When using appreciably less adhesive than 3% the coating may have a tendency to rub off.

The adhesives mentioned in the foregoing are examples of a class which are readily compatible with the ordinary pigments. Other non-water-soluble adhesives may be found to exhibit a certain incompatibility with the pigment, which is shown by the inability of the adhesive to coat the particles of the pigment. In many such cases, however, it is found that the use of a suitable plasticizer will overcome the incompatibility. Examples of satisfactory coating compositions employing synthetic resins which are normally incompatible with the pigment are as follows:

(11) 100 g. of clay
  15 g. of methyl methacrylate resin
  6 g. of sulfonated castor oil
  225 g. of ethylene dichloride
  35% solids

(12) 100 g. of clay
  15 g. of methyl methacrylate resin
  6 g. of dibutyl phthalate
  225 g. of ethylene dichloride
  35% solids

(13) 100 g. of clay
  15 g. of polyvinyl acetate
  6 g. of sulfonated castor oil
  225 g. of ethylene dichloride
  35% solids

(14) 100 g. of clay
  15 g. of polyvinyl acetate
  6 g. of dibutyl phthalate
  225 g. of ethylene dichloride
  35% solids

(15) 100 g. of clay
  15 g. of acrylic acid resin
  6 g. of dibutyl phthalate
  225 g. of ethylene dichloride
  35% solids In making up the coating compositions according to the above formulas, the pigment is ground with the adhesive, the plasticizer, if any, and sufficient solvent to give a working consistency, a suitable mill, e. g., an ink grinder, being employed for the purpose. The ground mixture is then diluted with the proper amount of solvent.

The composition according to the foregoing examples may be applied to the web to be coated in known manner with recovery of the solvent which is volatilized during the drying operation. The web to be coated may be any paper of known composition and properties such as are commonly used in the art of making coated papers. Further advantages of the improved composition are as follows:

1. The use of a small amount of the adhesive makes it possible to have a sheet with high color and brightness without having to use special pigments and dyes.
2. Solvent coated papers are stronger than those with aqueous coatings.
3. There is no tendency for the paper to blacken when calendered.
4. There is no distortion of the paper while being coated.
5. There is no tendency for foam or grease spots to develop.
6. There is no deterioration of the adhesive during storage or during the makeup period in the color room whereafter it is placed on the paper. It also makes a sheet having no offensive odor.
7. Since there is no distortion of the sheet during coating, the formation of wrinkles and calender cuts is substantially eliminated, thus cutting down the amount of so called "broken."

Various changes will occur to those skilled in the art which do not depart from the spirit of my invention.

I claim:
1. An improved paper having a base sheet and a coating comprising clay and in which the clay particles are held together and to the base sheet by a synthetic water-insoluble plastic material of the group consisting of

Ethyl cellulose (carbon tetrachloride soluble)
  Polyvinyl acetate-methylal
  Polyvinyl acetate-acetal
  Polystyrene
  Cellulose acetobutyrate
  Methyl methacrylate resin
  Polyvinyl acetate
  Acrylic acid resin the said coating having been deposited on the base sheet from a solution of the plastic material in a volatile organic solvent carrying the clay in suspension and the content of said plastic material being from 3% to 30% based on the dry weight of the coating.

2. An improved paper having a base sheet and a coating of mineral pigments, characterized by the particles of said coating being held together and to the base sheet by synthetic plastic material of the group consisting of methyl methacrylate resin, polyvinyl acetate, acrylic acid resin, not normally wetting the coating pigment particles, said plastic material being admixed with a plasticizer, the said coating having been deposited on the base sheet from a solution of the plastic material in a volatile organic solvent carrying the mineral pigments in suspension and the content of said plastic material being from 3% to 30% based on the dry weight of coating.

3. An improved paper having a base sheet and a coating comprising mineral pigments normally used in the manufacture of coated papers, and in which the pigment particles are held together and to the base sheet by ethyl cellulose which is soluble in a chlorinated volatile solvent, the said coating having been deposited on the base sheet from a solution of the ethyl cellulose in the said solvent carrying the pigments in suspension and the content of said ethyl cellulose being from 3% to 30% based on the dry weight of the coating.

4. An improved paper having a base sheet and a coating of mineral pigments and in which the pigment particles are held together and to the base sheet by polystyrene, the said coating having been deposited on the base sheet from a solution of the polystyrene in a volatile organic solvent carrying the mineral pigments in suspension and the content of said polystyrene being from 3% to 30% based on the dry weight of the coating.

5. An improved paper having a base sheet and a coating of mineral pigments and in which the pigment particles are held together and to the base sheet by methyl methacrylate resin, the said coating having been deposited on the base sheet from a solution of the methyl methacrylate resin in a volatile organic solvent carrying the mineral pigments in suspension and the content of said methyl methacrylate resin being from 3% to 30% based on the dry weight of the coating.

JAMES GRANT HAYDEN, Jr.